Nov. 9, 1971  T. L. DU BELL  3,618,317
FUEL DELIVERY APPARATUS
Filed April 17, 1969
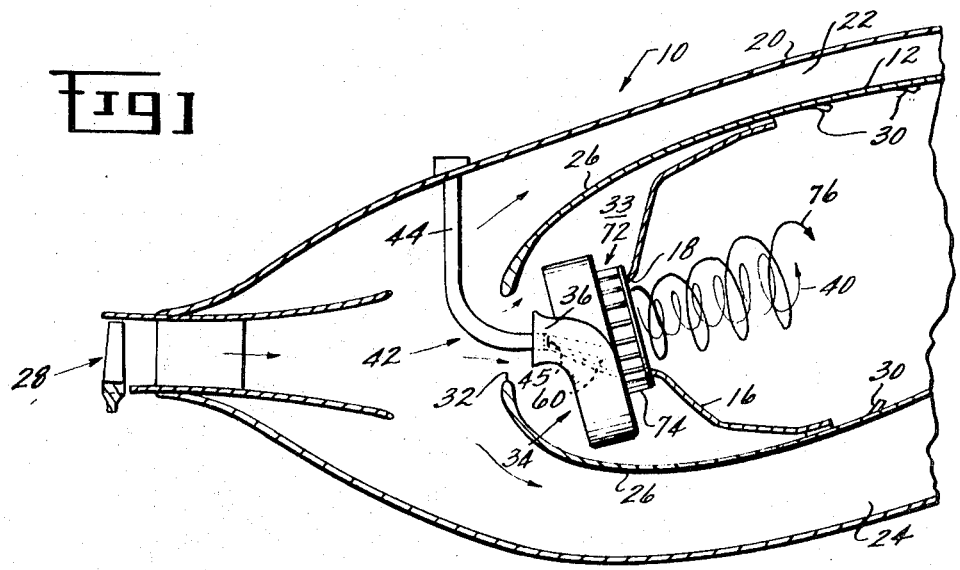
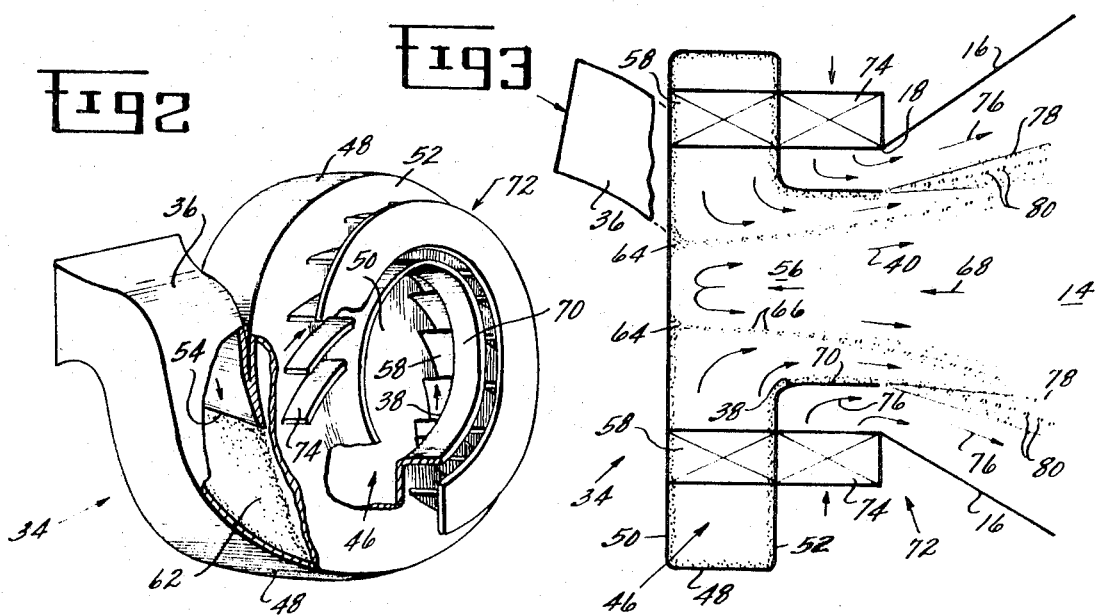
INVENTOR.
THOMAS L. DU BELL United States Patent Office 3,618,317
Patented Nov. 9, 1971

3,618,317
FUEL DELIVERY APPARATUS
Thomas L. Du Bell, Cincinnati, Ohio, assignor to
General Electric Company
Filed Apr. 17, 1969, Ser. No. 817,075
Int. Cl. F02c *1/00;* F02g *1/00*
U.S. Cl. 60—39.65                                       8 Claims

ABSTRACT OF THE DISCLOSURE

An improvement for apparatus of the type adapted to premix air and fuel or carburet air prior to introduction thereof as a vortical flow into the primary zone of a combustor; the improvement comprises a fuel collection or control surface disposed about and defining the vortical flow outlet of the apparatus together with means for generating a secondary flow of air into the combustion chamber about the collection surface to provide positive and controlled introduction of fuel to the combustor over a wide range of operating conditions.

---

This invention relates to combustion apparatus and, more particularly, to apparatus for supplying fuel to a combustion chamber. The invention herein described was made in the course of or under a contract, or a subcontract thereunder, with the United States Department of the Air Force.

Delivery of fuel into a continuous burning combustion apparatus, as for example in gas turbine engines, in a highly dispersed manner so as to achieve complete and efficient combustion of the fuel and, at the same time, minimize the occurrence of fuel-rich pockets, which upon combustion produce carbon or smoke, has posed a continuing design problem. Solutions of this problem are further complicated in applications such as gas turbine engines by the severe temperature environment of the combustion chamber as well as overall length limitations for the combustion apparatus.

One proposed solution to the foregoing problem involves the use of a device for carbureting the inlet air or mixing the air and fuel and for delivering the combustible air/fuel mixture into the primary zone of the combustor as a vortical flow. More specifically, the proposed device comprises a housing defining an air vortex generator or spin chamber therein about a centrally disposed core outlet. The housing is adapted to receive fuel and air, circulate the fuel and air in the spin chamber and generate a vortical or cyclonic discharge flow of air and highly dispersed fuel. While such a device has demonstrated substantially improved characteristics over other well-known prior art fuel injection devices, it has been found that under certain operating conditions in gas turbine engines, such as high fuel/air ratios and/or low temperature inlet air, ignition or light-off may be difficult to achieve and burning characteristics may deteriorate.

Accordingly, a primary object of this invention is to provide an apparatus for delivery of a carbureted air vortex into a combustor, said apparatus having improved light-off and burning characteristics over a broad range of operating conditions.

Another object of this invention is to provide an apparatus, as above, which is adapted to insure positive and controlled introduction of the fuel over a wide range of fuel/air ratios and inlet air temperatures.

The above and other objects are achieved in the present invention by providing a housing having a central or core outlet in flow communication with the combustion chamber and defining a spin chamber around the outlet. The spin chamber is adapted to receive and circulate pressurized air and fuel around the outlet and generate a primary vortical discharge of air from the outlet. The spin chamber is preferably formed with an involute or spiral-shaped outer wall and generally planar upstream and downstream end walls. Inlet passage means may be provided for receiving a generally axially directed flow of pressurized air and directing such air in a generally streamline manner into the spin chamber. The inlet passage means may also be adapted to receive and direct the fuel into the swirl chamber, although separate passage means may be used. A primary array of swirl vanes may be employed within the spin chamber to enhance the rotational velocity of the primary vortex discharge as well as accurately locate the primary vortex centrally of the outlet.

In order to provide positive and controlled introduction of the fuel during conditions of low inlet air temperature, such as during gas turbine engine start-up, high fuel-to-air ratios, or a combination thereof, a collection surface is provided at the outlet for collection of non-vaporized or atomized fuel that may be expelled from the apparatus, and means for generating a secondary flow of air into the combustor, about the collection surface and the primary vortex so as to carry the collected fuel into the combustor and create a region of high shear stress between the primary vortex and the secondary flow wherein the fuel leaving the collection or control surface is sheared into small atomized droplets which quickly vaporize. The control or collection surface preferably comprises an annular sleeve, secured to or formed integrally with the downstream end wall of the housing. The sleeve is disposed around and defines the primary vortex core outlet and extends generally axially downstream relative to the primary vortex discharge. The secondary flow generating means preferably comprises a secondary array of swirl vanes spaced radially outwardly of the sleeve so as to define an annular passage therebetween which is in flow communication with the combustion chamber. The swirl vanes, in cooperation with the sleeve, are preferably adapted to generate and deliver a secondary vortical flow into the combustion chamber, about the primary vortex, which is generally coaxial with and counter-rotating relative to, the primary vortex.

While the specification concludes with claims particularly pointing out and distinctly claiming the subject matter of this invention, it is believed the invention will be better understood upon reading the following description of the preferred embodiment in conjunction with the accompanying drawing wherein:

FIG. 1 is a fragmentary axial cross sectional view of an exemplary gas turbine engine combustion apparatus embodying the improved apparatus of this invention;

FIG. 2 is a perspective view, with portions removed, of the improved apparatus of FIG. 1; and FIG. 3 is a diagrammatical axial cross sectional view of the apparatus of FIG. 2 showing the air and fuel flow patterns generated thereby.

Referring now to the drawings, and particularly to FIG. 1, a continuous burning combustion apparatus of the type suitable for use in a gas turbine engine has been shown generally at 10 as comprising a hollow body 12 defining a combustion chamber 14 therein. The hollow body 12 includes a domed upstream closure member 16, having an opening 18 therein for receiving a fuel/air mixture, defines the upstream end of the chamber 14 and may be suitably secured to or formed integrally with the hollow body 12. As will be understood by those skilled in the art, the combustion chamber 14 may be of the annular type, the cannular type, or the can type, with the apparatus 10 having a plurality of circumferentially spaced openings 18.

An outer shell 20 may be provided to enclose the hollow body 12 and define passages 22 and 24 in cooperation with the hollow body 12 and an upstream extension 26 of the hollow body 12. As will be understood, the passages 22 and 24 are adapted to deliver a flow of pressurized air from a suitable source, such as a compressor 28, into the combustion chamber 14 through suitable apertures or louvers 30 for cooling of the hollow body 12 and dilution of the gaseous products of combustion.

The upstream extension 26 of the hollow body 12 is adapted to function as a flow splitter to divide the pressurized air delivered from the compressor 28 between passages 22, 24 and an upstream end opening 32 of the extension 26. The opening 32 communicates with a chamber 33 which is defined internally of the extension 26.

The improved fuel injection apparatus of this invention has been shown generally at 34 as comprising a housing having inlet passage means 36 for receiving pressurized air from the compressor 28, a first or core outlet 38 in flow communication with the hollow body opening 18 for delivery of an air/fuel mixture into the combustion chamber 14 as primary vortical flow 40. Suitable fuel delivery means 42 are provided to deliver fuel into the inlet passage 36. The fuel delivery means 42 may comprise a conduit 44, having a discharge end 45, which extends through the outer shell 20 and communicates with a source of pressurized fuel. While the improved fuel injection apparatus 34 is particularly adapted for use with liquid fuel and will be hereinafter described in connection with a liquid fuel, it will be understood that fuel in the liquid state, gaseous state, solid state or a combination thereof may be effectively used.

As will be understood, suitable ignition means (not shown) are provided within the combustion chamber 14 to provide initial ignition of the combustible air/fuel mixture discharged by apparatus 34.

Referring now to FIGS. 2 and 3, the housing has been shown as comprising an involute outer wall 48 and generally planar, spaced upstream and downstream end walls 50 and 52, respectively, which are peripherally joined to the outer wall 48. As best shown in FIG. 3, the housing defines an air vortex generator or spin chamber 46 outwardly of the outlet 38. The outer wall 48 has been shown as being generally involute or spiral in shape with a progressively decreasing radius from the inlet passage 36 to a terminal edge or lip 54 which defines, in part, the inlet opening from passage 36 to the spin chamber 46. The inlet passage 36 is formed with a generally axially-facing, upstream end opening for receiving a flow of pressurized inlet air from compressor 28 and has one wall formed as a streamline continuation of the involute outer wall 48 so as to deliver the inlet air in a generally streamline manner into the spin chamber 46. In this manner, the pressurized inlet air is directed from inlet passage 36 in a circular motion of ever-decreasing radius so as to generate the primary vortical or cyclonic discharge 40 having a hollow core 56. To further enhance the swirling motion of the primary vortex 40 as well as accurately position the vortical flow 40 relative to the opening 38, a plurality of primary swirl vanes 58, each of which extends between the upstream and downstream walls 50 and 52, may be provided in a peripheral array about the outlet 38 as shown in FIGS. 2 and 3. Such an array of swirl vanes may also be adapted to throttle the air passing therethrough so as to increase the rotational velocity of the primary vortical flow 40.

While the outer wall 48 of the spin chamber 46 and the passage means 36 have been shown and described as being involute, and such is the preferred construction, it should be understood that other vortex generator or spin chamber and passage means configurations may be employed. For example, the spin chamber may be circular and the passage means may be adapted to deliver the inlet air in a tangential manner.

In order to maintain a generally uniform rotational velocity of the inlet air within the spin chamber 46, outwardly of the vanes 58, the outlet 38 and swirl vanes 58 are preferably positioned with respect to the outer wall 48 so that the cross sectional flow area progressively decreases from the inlet 36 to the lip 54.

The apparatus 34 may be secured in the position of FIG. 1 by any suitable means, such as by welding to the end closure member 16 or by suitable bracketry (not shown).

In operation, liquid fuel 60 is delivered to inlet passage 36 through means 42. Some of this fuel may be immediately picked up by or entrained within the high velocity inlet air and carried into the combustor. The remaining fuel lands on the interior surface of the inlet passage 36 and is driven or pushed by the high velocity air into the spin chamber 46 and centrifugally along outer wall 48. During such flow, a portion of the fuel may be vaporized and/or atomized and entrained within the inlet air flow. A portion of the outer wall fuel flow which is not so evaporated is then sheared off the lip 54, as at 62, and again passes across the inlet air flow path which results in more fuel being entrained within the inlet air. In addition to the above and with reference to FIG. 3, the liquid fuel circulating within spin chamber 46 is carried by the air in a swirling flow along the inner surface of upstream wall 50 by the swirling air flow. Such upstream wall fuel flow is carried through the vanes 58 and forms a ring of fuel 64 where the fuel velocity forces are balanced by the centrifugal forces. While flowing along the inner surface of upstream wall 50 to the ring 64, some of the fuel may be evaporated from the surface by the inlet air and by radiant heat from the flames within the combustion chamber 14. The liquid fuel within the ring of fuel 64 is spun off and atomized into extremely small fuel droplets by the high velocity vortical flow of air 40 and directed or carried toward the combustion chamber 14 as a conical spray 66. Since these atomized fuel droplets are extremely small, they quickly vaporize and mix with the air vortex 40.

Since the vortex core 56 is at a reduced pressure, a reverse or recirculation flow is established from the combustion chamber 14 as generally shown at 68 in FIG. 3. This recirculation of high temperature gas from the chamber 14 into the central or core portion of the spin chamber 46 further enhances vaporization of the liquid fuel from the spin chamber surfaces as well as vaporization of any atomized fuel droplets carried by the intake air or expelled from the fuel ring 64.

When the inlet air is at a relatively low temperature as, for example, during gas turbin engine start-up, or in applications requiring a high fuel-to-air ratio, it has been found that fuel may flow to the outlet 38 along downstream wall 52 in the manner described above in connection with upstream wall 50. To establish positive and controlled distribution of such downstream wall fuel flow so as to enhance light-off and overall burning characteristics of the air/fuel mixture discharge from apparatus 34, a control or collector surface 70 is provided to collect such downstream wall flow together with means 72 for introducing a secondary flow of air into said combustion chamber 14 and about and along the control surface 70 in a manner which carries such collected fuel as an atomized spray into combustion chamber 14.

In the depicted embodiment, the control or collection surface 70 takes the form of an annular sleeve extending around the outlet 38 and defining a downstream extension thereof. The sleeve 70 may be suitably joined to the downstream wall 52 or formed integrally therewith.

The secondary air flow means 72 has been shown as comprising a plurality of swirl vanes 74, spaced radially outwardly of and in a circular array around, sleeve 70. The swirl vanes 74 are suitably secured between the downstream wall 52 and an annular rim spaced axially downstream thereof. The array of swirl vanes 74 and annular rim are spaced radially outwardly of the sleeve 70 so as to form an axially extending annular passage therebetween which is generally coaxial with the outlet 38 and vortical flow 40. As best shown in FIG. 3, the apparatus 34 is positioned with the annular rim closely spaced or joined to the rim of end closure member opening 18 so as to establish a flow of pressurized air from chamber 33, radially inwardly through the swirl vanes 74, and hence axially into the combustion chamber 14. The swirl vanes 74 are adapted to swirl such air flow and generate a secondary vortical flow 76 which is preferably counter-rotating relative to the primary vortex 40, although it may be otherwise. In this manner, a region of high shear stress 78 is created downstream of the sleeve 70 at the outer boundary of the vortex 40 due to the interaction of the primary and secondary flow.

In operation, any fuel flow along downstream wall 52 is carried or pushed to the downstream end of sleeve 70 in a swirling flow by the vortex discharge 40. The fuel is then spun or sheared off the downstream end of sleeve 70 by the primary and secondary flows 40 and 76 and carried into the region 78 of high shear stress where it is sheared into small droplets 80 which quickly vaporize. Accordingly, by providing the control surface or sleeve 70 and secondary flow generating means 72, positive and controlled introduction of all liquid fuel effluxing from apparatus 34 is achieved over a wide range of operating conditions in a gas turbine engine.

From the foregoing, it will be appreciated that the present invention provides an imroved apparatus of simplified and economical construction for efficiently and satisfactorily introducing fuel into a combustion chamber in a positive and controlled manner over a wide range of operating conditions.

While the secondary flow generating means 72 has been depicted and described as comprising an array of swirl vanes 74, it should be understood that other arrangements may be employed and that such means may be formed as an element of the end closure member 16 as well as the apparatus 34. Additionally, while the secondary air flow is preferably counter-rotating relative to the primary vortex 40, it may be a pure axial flow or even co-rotating with vortex 40. It should also be understood that while the collector surface or sleeve 70 has been shown as being generally cylindrical, the present invention is not so limited and other shapes may be employed. Accordingly, while a preferred embodiment of the present invention has been depicted and described, it will be appreciated by those skilled in the art that many modifications, substitutions and changes may be made thereto without departing from the invention's fundamental theme.

What is claimed is:

1. In a combustion apparatus of the type including a hollow body defining a combustion chamber therein and means disposed outwardly of said combustion chamber and defining a spin chamber adapted to receive pressurized air and a liquid fuel and circulate said air and fuel about and radially outwardly of a centrally disposed outlet in a downstream wall of said means and generate a primary vortical discharge flow of said air and said fuel from said outlet into said combustion chamber, the improvement comprising:

an annular sleeve joining said downstream wall and extending downstream thereof, said sleeve defining a downstream extension of the outer boundary of said outlet for collecting liquid fuel flowing along said downstream wall to said outlet, whereby said fuel is carried to the downstream end of said sleeve, and means for generating a secondary flow of air about and along said annular sleeve and into said combustion chamber, whereby the fuel is sheared from the downstream end of said sleeve as small droplets and introduced into said combustion chamber in a highly dispersed manner.

2. The improved apparatus of claim 1 further characterized in that said secondary flow generating means is adapted to deliver said secondary flow as a vortex about, and counter-rotating relative to, said primary vortex.

3. The apparatus of claim 1 further characterized in that said secondary flow generating means includes a plurality of swirl vanes disposed in a radially outwardly spaced circular array about said annular sleeve.

4. Apparatus for introducing fuel into a combustion chamber, said apparatus comprising:

a housing having a downstream end wall formed with a core outlet therein, said housing defining a spin chamber around and radially outwardly of said core outlet, said core outlet adapted to establish flow communication between said spin chamber and said combustion chamber;

means for receiving and directing pressurized air and fuel into said spin chamber;

said spin chamber adapted to utilize the energy of said pressurized air to circulate said air and said fuel about said core outlet and to generate a primary vortical discharge flow of said air from said core outlet, whereby fuel is entrained within said primary vortical flow and discharged from said outlet in a highly dispersed manner;

an annular sleeve joining said downstream wall and defining a downstream extension of the outer boundary of said outlet for collecting liquid fuel flowing along said downstream wall, whereby said fuel is carried to the downstream end of said sleeve; and means for directing a secondary flow of pressurized air around and along said annular sleeve and into combustion chamber, whereby collected fuel is sheared from the downstream end of said sleeve and introduced into the combustion chamber in a controlled and highly dispersed manner.

5. The apparatus of claim 4 further characterized in that said secondary flow means is adapted to deliver said secondary flow as a vortex about, and counter-rotating relative to, said primary vortex.

6. The apparatus of claim 5 further characterized in that said secondary flow means includes a plurality of swirl vanes disposed in a radially outwardly spaced circular array about said annular sleeve.

7. The apparatus of claim 4 wherein said housing is further defined by an arcuate outer wall and an upstream end wall, said end wall peripherally joining said outer wall, said fuel and air directing means communicating with said spin chamber through said outer wall.

8. The apparatus of claim 4 further characterized by and including a primary array of swirl vanes disposed about said core outlet internally of said housing.

References Cited

UNITED STATES PATENTS

| | | | |
|---|---|---|---|
| 2,438,858 | 3/1948 | Lindsey et al. | 60—39.65 |
| 3,030,773 | 4/1962 | Johnson | 60—39.65 |
| 3,242,674 | 3/1966 | Clarke et al. | 60—39.65 |

FOREIGN PATENTS

| | | |
|---|---|---|
| 376,570 | 5/1923 | Germany. |

SAMUEL FEINBERG, Primary Examiner

U.S. Cl. X.R.

60—39.71, 39.74; 431—173